US009354685B2

(12) United States Patent  
Stone et al.

(10) Patent No.: US 9,354,685 B2  
(45) Date of Patent: May 31, 2016

(54) COMMUNICATION AND CONTROL FOR POWERED DEVICES

(71) Applicants: Christopher Stone, Newtown, PA (US); Ross Gilson, Philadelphia, PA (US); Michael Sallas, Havertown, PA (US); Edward R. Grauch, Philadelphia, PA (US)

(72) Inventors: Christopher Stone, Newtown, PA (US); Ross Gilson, Philadelphia, PA (US); Michael Sallas, Havertown, PA (US); Edward R. Grauch, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 377 days.

(21) Appl. No.: 13/826,315

(22) Filed: Mar. 14, 2013

(65) Prior Publication Data  
US 2014/0281597 A1 Sep. 18, 2014

(51) Int. Cl.  
*G06F 1/26* (2006.01)  
*G06F 1/28* (2006.01)  
*G06F 11/07* (2006.01)  
*G06F 1/30* (2006.01)  
*G06F 11/32* (2006.01)  
*H02M 1/32* (2007.01)

(52) U.S. Cl.  
CPC .. *G06F 1/30* (2013.01); *G06F 1/28* (2013.01); *G06F 1/26* (2013.01); *G06F 11/0745* (2013.01); *G06F 11/0772* (2013.01); *G06F 11/327* (2013.01); *H02M 1/32* (2013.01)

(58) Field of Classification Search  
CPC ......... G06F 1/26; G06F 1/28; G06F 11/0745; G06F 11/327  
USPC .................................................. 713/300, 310  
See application file for complete search history.

(56) References Cited

U.S. PATENT DOCUMENTS

| 2006/0031720 | A1* | 2/2006 | Choi ............................... 714/43 |
| 2007/0232363 | A1* | 10/2007 | Kimura et al. ................ 455/572 |
| 2008/0100145 | A1* | 5/2008 | Ito .............................. H02J 3/38 307/125 |
| 2011/0163695 | A1* | 7/2011 | Schmid ..................... H02J 1/14 315/307 |

OTHER PUBLICATIONS

ZigBee, Control Your World, "Understanding ZigBee RF4CE", Feb. 2013., 11 pages.

* cited by examiner

*Primary Examiner* — Michael J Brown  
(74) *Attorney, Agent, or Firm* — Banner & Witcoff, Ltd.

(57) ABSTRACT

A first device (such as a power supply) may detect a power anomaly and provide a warning to a second device that is powered by the first device. For example, if there are conditions indicating an increased likelihood of a power outage (e.g., a brownout period, one or more voltage spikes, etc.), then the first device may notify the second device, and in response, the second device may take protective action. Examples of protective action may include, but are not limited to, saving certain data (e.g., critical data) to non-volatile data storage, initiating a shut-down procedure, warning a user of the second device, etc. As the warning and/or other communications between the power supply and powered device may be wireless, various example techniques for wirelessly pairing the devices are also disclosed.

20 Claims, 15 Drawing Sheets

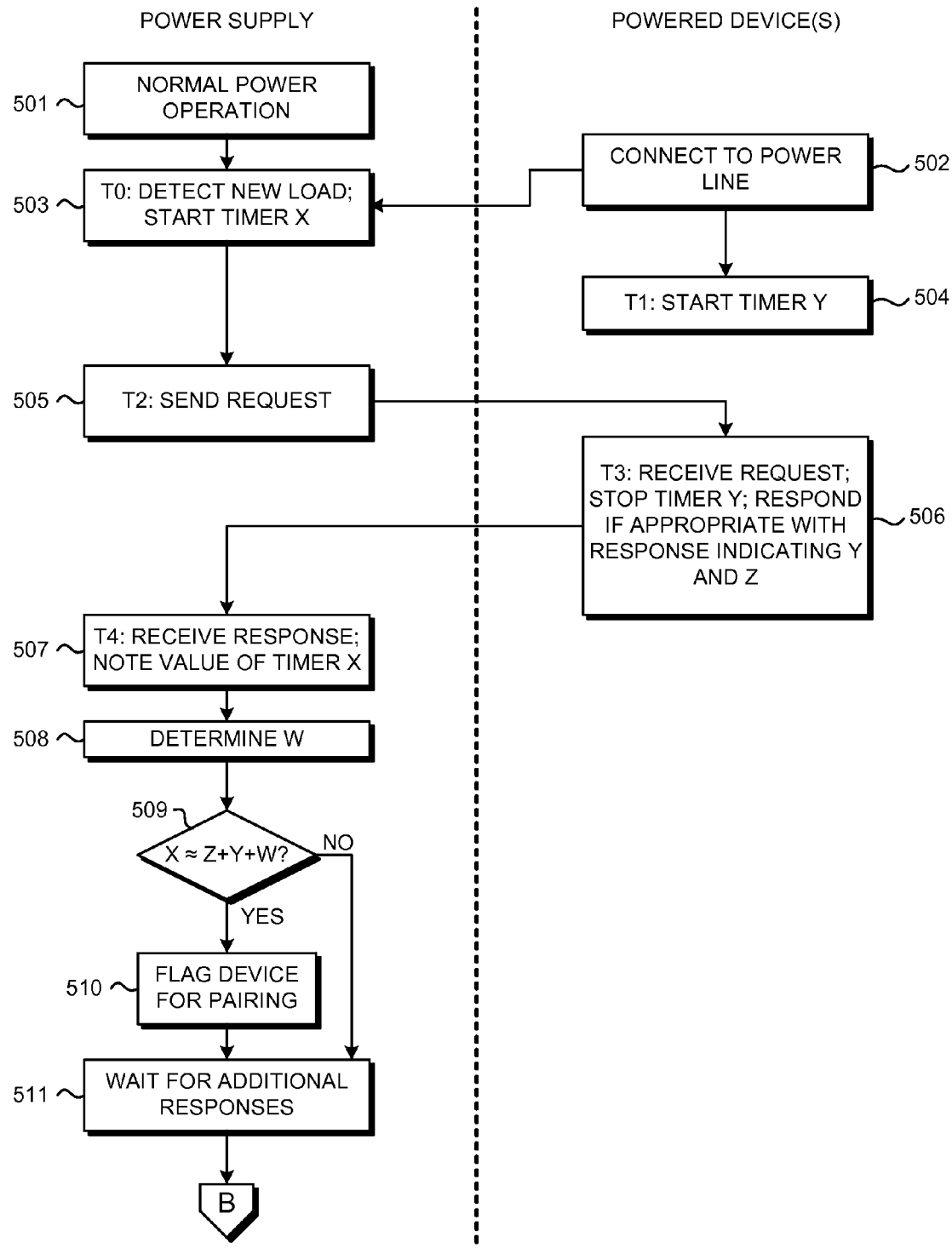
Fig. 5-A

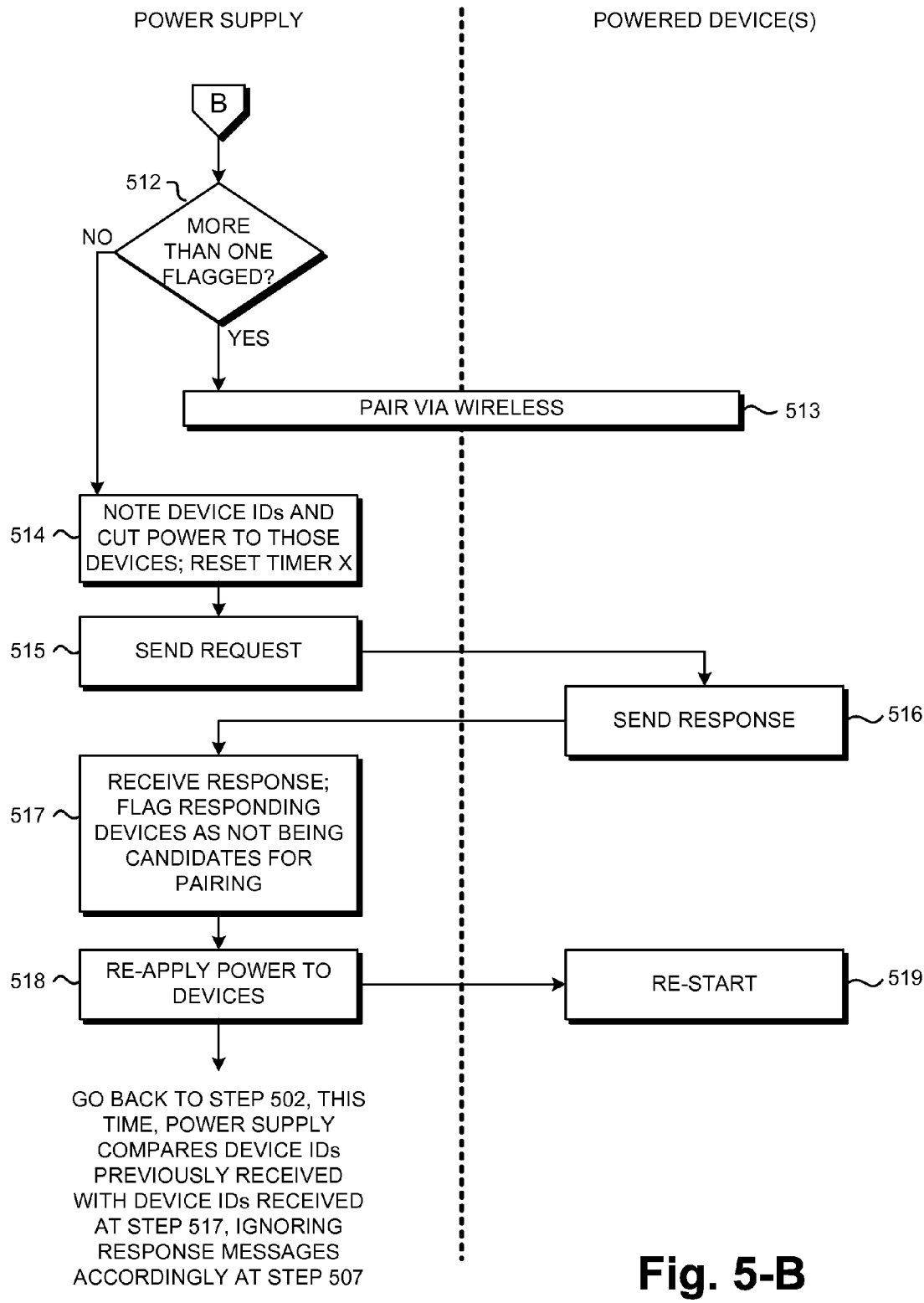
Fig. 5-B

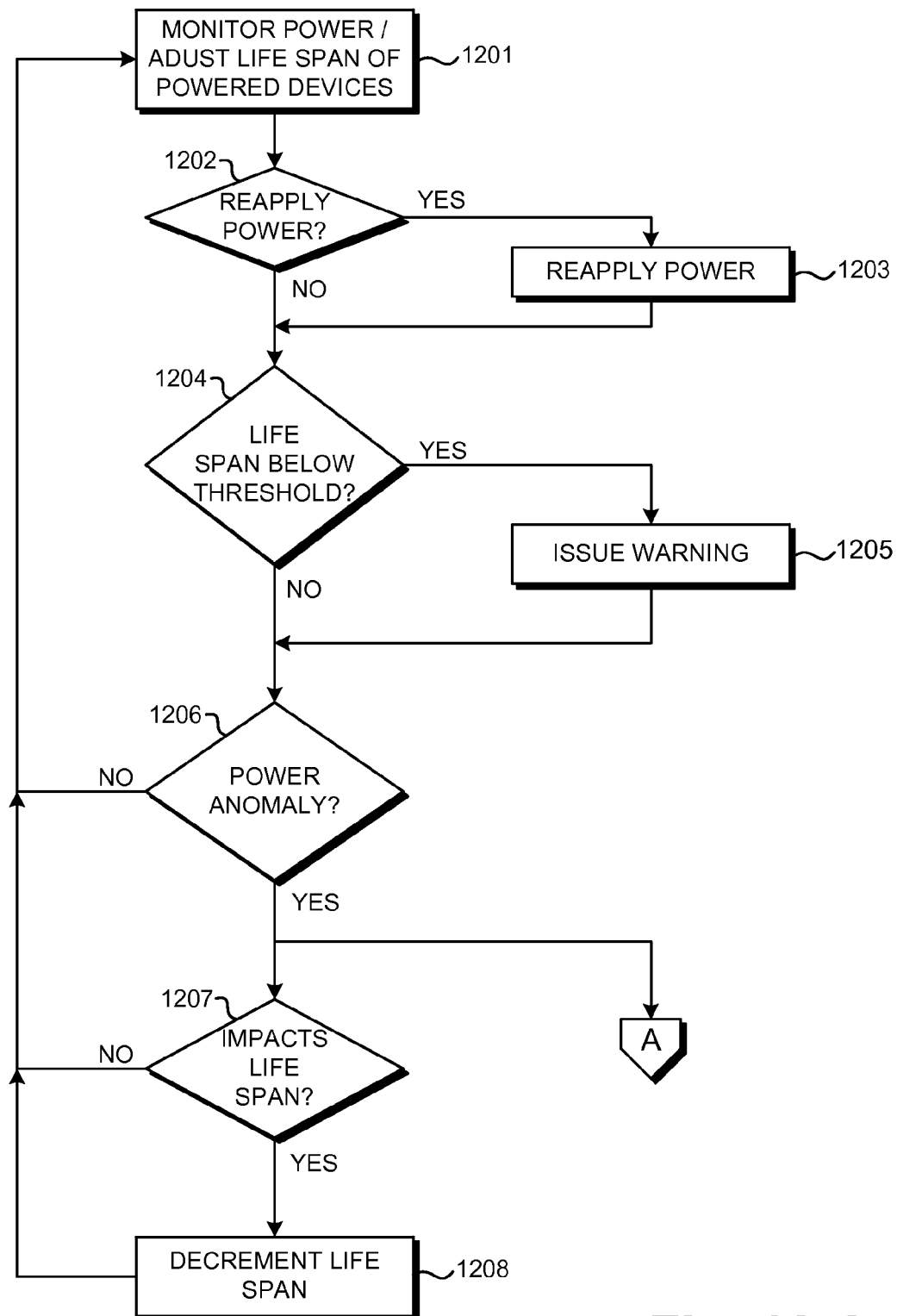
Fig. 12-A

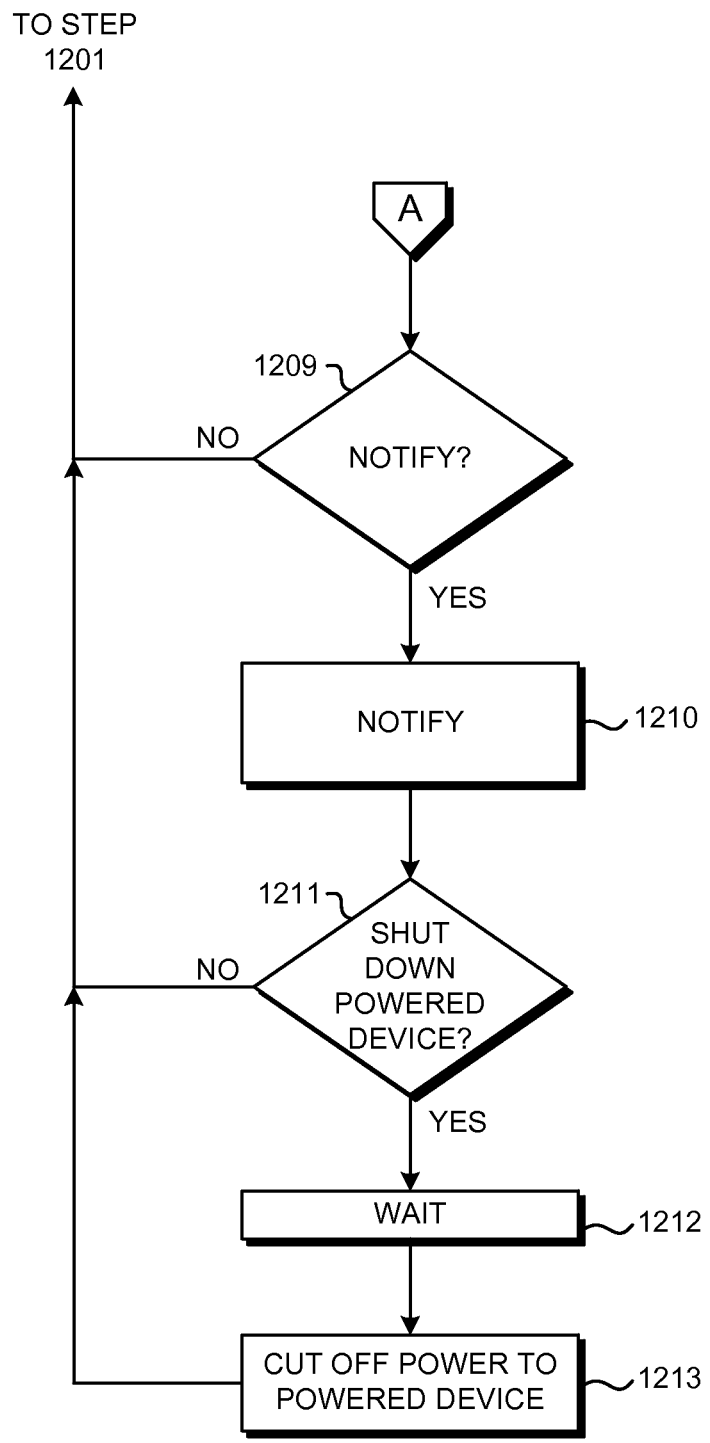
Fig. 12-B

COMMUNICATION AND CONTROL FOR POWERED DEVICES

BACKGROUND

Many electronic devices rely on an external source of power to operate. However, the source of power may not always be reliable—power spikes, outages, and other anomalies may occur. Depending upon the type of anomaly, a device may be damaged and/or may function improperly.

SUMMARY

In one aspects, it may be desirable to provide a first device (such as a power supply) that is able to detect power characteristics such as anomalies and provide a warning, such as a warning message to another device or system, such as to a service provider and/or to a second device that is being powered by the first device. For example, if there are conditions indicating an increased likelihood of a power change, interruption, or outage (e.g., a brownout period, one or more voltage spikes, etc.), then the first device may notify the second device, and in response, the second device may take protective action (e.g., proactive and/or remedial actions). Examples of protective action may include, but are not limited to, saving certain data (e.g., critical data) to non-volatile data storage, initiating a shut-down procedure of some or all features, applications, and/or device components, warning a user of the second device, etc.

In another aspect, communications between the first and second device may be at least partially wireless. For example, the warning by the first device to the second device of a power issue may be sent as a wireless message. In some environments, there may be multiple power supplies and multiple powered devices that are capable of communicating with each other. Thus, it may be useful to wirelessly pair the power supplies with corresponding devices they are powering so that wireless messages between the paired devices may be listened to or ignored as appropriate. Various example processes for wirelessly pairing a power supply or other device with a powered device are disclosed herein.

According to some aspects as described herein, methods, apparatuses, and software may perform, for example, at least the following process. A first device, such as a power supply (e.g., a power generator, power converter, power conditioning device, etc.), may detect a power anomaly. In response, the first device may determine whether to notify a second device powered by the first device. If so, then the first device may wirelessly send a message to the second device. The second device may take action (e.g., protective, remedial, proactive, etc.) in response to receiving the message.

According to further aspects as described herein, a first device (such as a power supply, e.g., a power generator, power converter, power conditioning device, etc.), may wirelessly send a first message while providing power to a power interface of another device, and a second message while not providing power to the power interface (e.g., power supply port). The first device may determine, based on one or more wireless responses to one or both of the first and second messages, an identifier of a second device coupled to the supply port.

According to still further aspects as described herein, a first device (such as a power supply) may receive information from a second device while the first device receives supply power and provides power to the second device. Responsive to detecting an anomaly of the supply power, the first device may use the information to determine whether to notify the second device. If so, then the first device may send a first message to the second device. The second device may take action (e.g., protective, remedial, proactive, etc.) in response to receiving the message.

These features are merely examples, and further features and details are discussed below.

BRIEF DESCRIPTION OF THE DRAWINGS

Some features herein are illustrated by way of example, and not by way of limitation, in the figures of the accompanying drawings and in which like reference numerals refer to similar elements.

FIGS. 5-A and 5-B show an example flow chart in accordance with one or more aspects as described herein.

FIGS. 12-A and 12-B show an example flow chart in accordance with one or more aspects as described herein.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Figure 1:
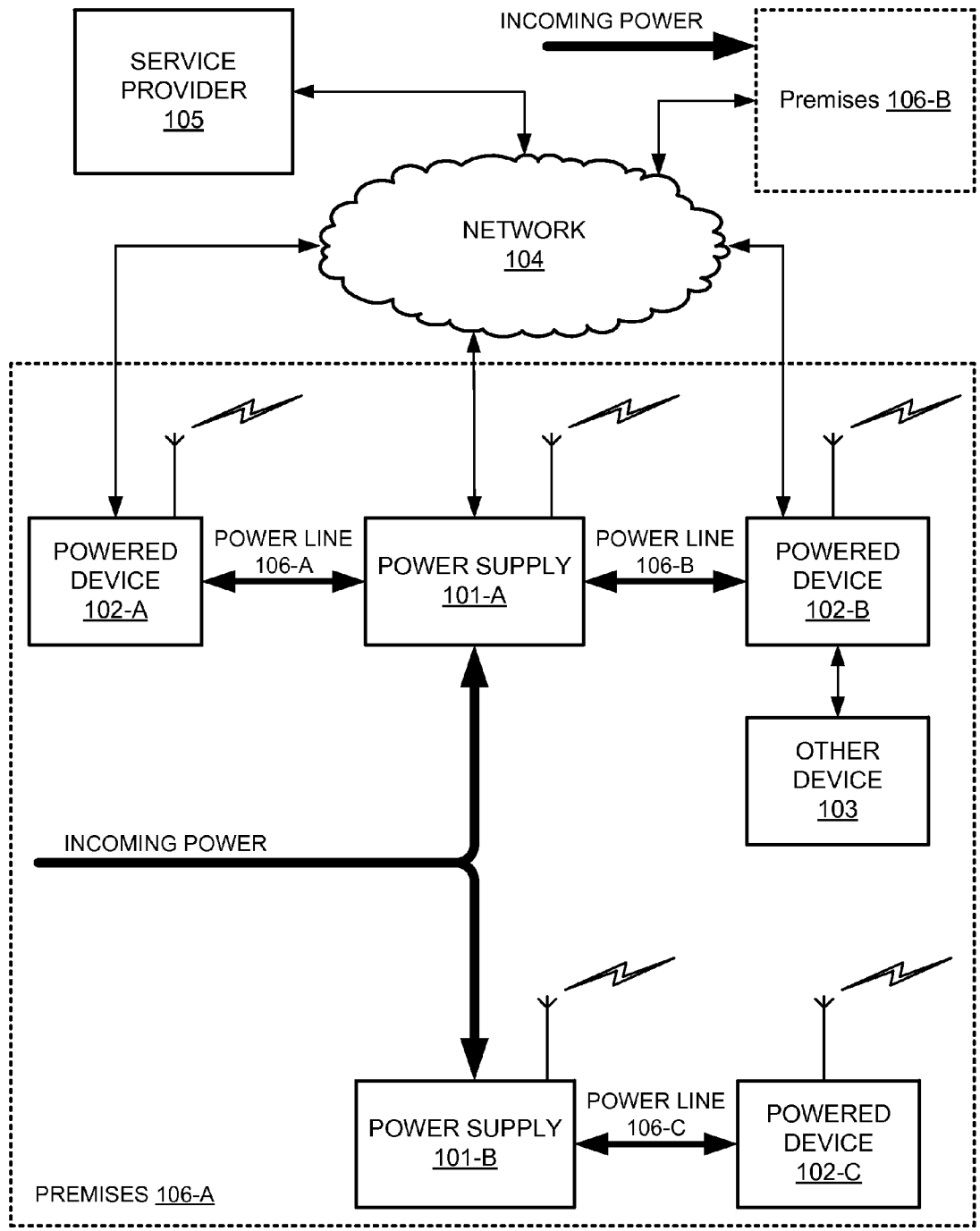
FIG. 1 illustrates an example system in accordance with one or more aspects as described herein.

FIG. 1 is a block diagram of an example system that may be used in accordance with one or more aspects described herein. The system may include one or more premises 106, which may each include one or more devices 101, such as power supplies (in this example, premises 106-A has power supplies 101-A and 101-B, although fewer or more power supplies may be present), one or more powered devices 102 (in this example, premises 106-A has powered devices 102-A, 102-B, and 102-C, although fewer or more powered devices may be present), zero, one, or more other devices 103, one or more networks 104, and/or one or more service providers 105. Unlike the other devices 103, the powered devices 102 may receive operational power from the devices (e.g., power supplies) 101. In this example, the power supply 101-A or other type of device supplies power to the powered devices 102-A and 102-B via power lines 106, and the power supply 101-B or other type of device supplies power to the powered device 102-C. The shown configuration is only an example; other configurations may be implemented as desired. Also while two premises 106-A and 106-B are shown, there may be only one premises or greater than two premises. A premises 106 may be, for example, a residence, a building, campus, region, room, floor, designated area of land, and/or any other location that may contain one or more devices.

Each of the devices 101 may receive incoming power (e.g., mains power, household 120V and/or 240V power, and/or any other power). Each of the devices 101 may further condition, convert, switch, adapt, and/or otherwise modify the incoming power as desired to provide outgoing power to the power lines 106 to be supplied to the respective powered devices 102. In further examples, any of the devices 101 may merely transfer and/or otherwise provide incoming power as outgoing power (e.g., to supply the powered devices 102) without performing any transformation of the incoming power in order to provide the outgoing power. Where a device 101 provides power to a powered device 102, the device 101 and the powered device 102 may be physically separate from each other. In fact, the device 101 and the powered device 102 may be in a separate room or building. It is also possible that the device 101 and the powered device 102 are at least partially physically integrated with each other. Each of the devices 101 may include a computing device that is capable of performing certain functions, such as but not limited to making decisions to remove and/or apply power from/to the powered devices 102, tracking the expected lifespan of the powered devices 102, communicating data with the powered devices 102, the network 104, and/or other devices via the respective power line 106, another wired line, and/or wirelessly, evaluating incoming power anomalies, and/or providing external indications of status to a user and/or to the service provider 105 via the network 104. In the following discussion, devices 101 will be referred to as power supplies. However, all references to power supplies are intended to broadly include any types of devices that are capable of generating, transferring, forwarding, converting, conditioning, adapting, switching, providing, evaluating, and/or supplying power to one or more other devices.

Each of the powered devices 102 may include a computing device and may be capable of performing functions such as, but not limited to, communicating data with the power supplies 101, other devices, and/or the network 104 via the respective power line 106, via another wired connection, and/or wirelessly. Each of the powered devices 102 may also perform other functions such as, but not limited to, receiving content such as multimedia content (e.g., audio and/or video content), storing the content, causing the content to be presented (e.g., displayed), and/or providing other services to a user. By way of example only, each of the powered devices 102 may be implemented as or otherwise include a set top box, a television, a digital video recorder, a multimedia server, a cable modem, a DSL modem, a router or other communications equipment, a mobile phone or other mobile computer, another type of phone, a non-mobile and/or other larger computer, a printer, a home security device, a home automation device, a household appliance (e.g., a refrigerator, oven, etc.), an industrial device (e.g., factory equipment), an electrically-powered vehicle, an electrically-powered train, etc. In other words, the powered devices 102 may be any devices, systems, and/or other apparatuses that benefit from receiving power from the power supplies 101. The other devices 103 may likewise be any devices such as, but not limited to, the above listed devices.

The network 104 represents one or more networks of any type or types. For example, the network 104 may be or otherwise include one or more of the Internet, a local network such as a wired and/or wireless LAN (e.g., IEEE 802.11 based and/or ZigBee/Z-Wave IEEE802.15.4 based WiFi LAN) and/or WAN, a cellular telephone and/or data network, a landline telephone and/or data network, a fiber optic network, a DOCSIS-compliant network, and/or a satellite communications network.

Figure 2:
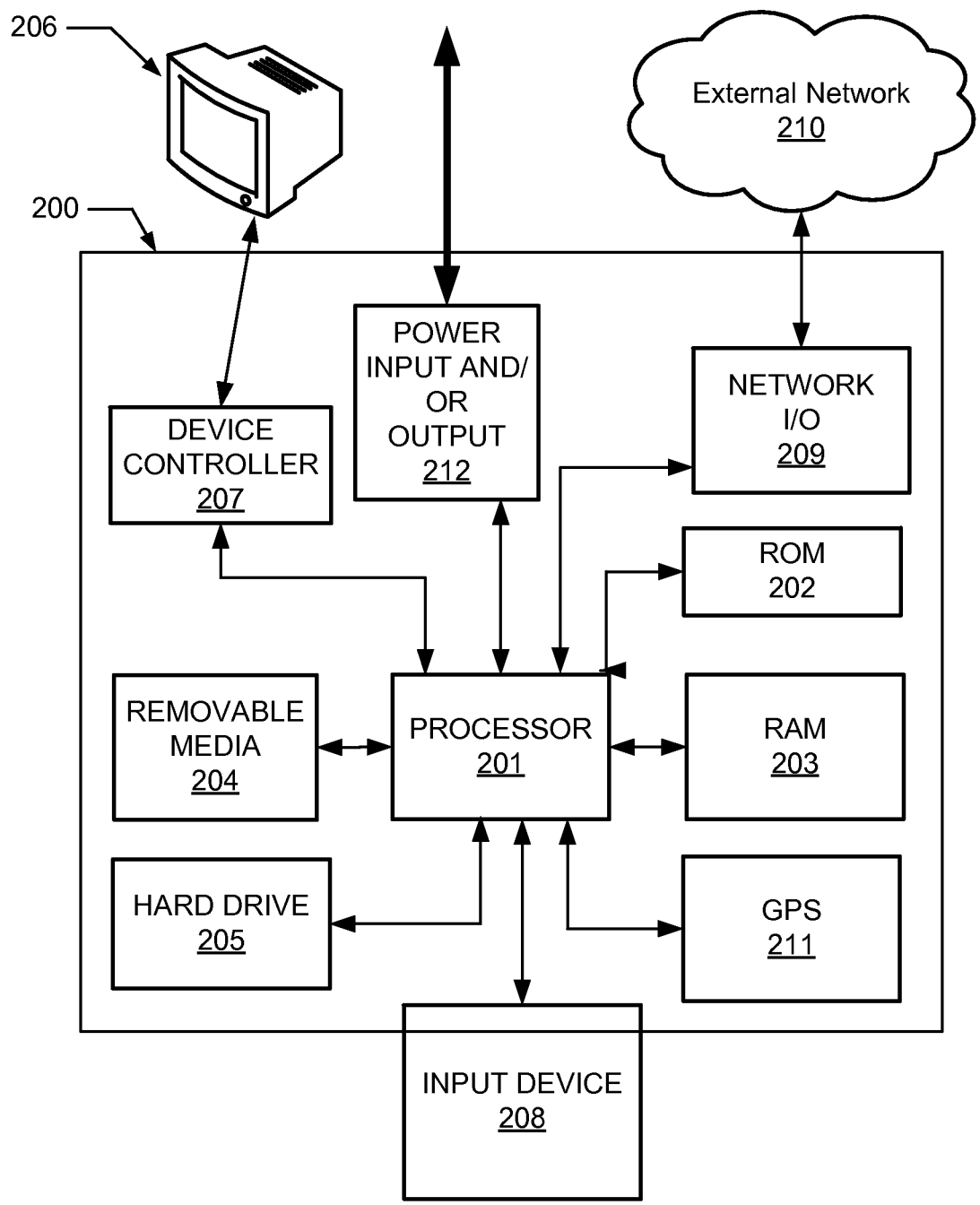
FIG. 2 illustrates an example hardware and/or software platform on which the various elements described herein can be implemented in accordance with one or more aspects as described herein.

FIG. 2 illustrates general hardware elements that can be used to implement any of the various computing devices discussed herein that may be included in, e.g., any of elements 101, 102, 103, 104, and/or 105. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired storage medium. Instructions may also be stored in an attached (or internal) hard drive 205. The computing device 200 may include one or more output devices, such as a display 206 (e.g., an external television), and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. In some embodiments, the network input/output circuit 209 may include a modem (e.g., a cable modem), and the external network 210 may include the communication links 101 discussed above, the external network 109, an in-home network, a provider's wireless, coaxial, fiber, or hybrid fiber/coaxial distribution system (e.g., a DOCSIS network), or any other desired network. Additionally, the device may include a location-detecting device, such as a global positioning system (GPS) microprocessor 211, which can be configured to receive and process global positioning signals and determine, with possible assistance from an external server and antenna, a geographic position of the device.

The FIG. 2 example is a hardware configuration. Modifications may be made to add, remove, combine, divide, etc. components of the computing device 200 as desired. Additionally, the components illustrated may be implemented using basic computing devices and components, and the same components (e.g., processor 201, ROM storage 202, display 206, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform (e.g., a requesting entity can be a separate software process and program from a dependent entity, both of which may be executed as software on a common computing device).

One or more aspects of the disclosure may be embodied in computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein. The discussion of example functionality and operations herein with reference to all of the figures may be implemented in part or in full by executing such software and/or using such data structures.

Figure 3:
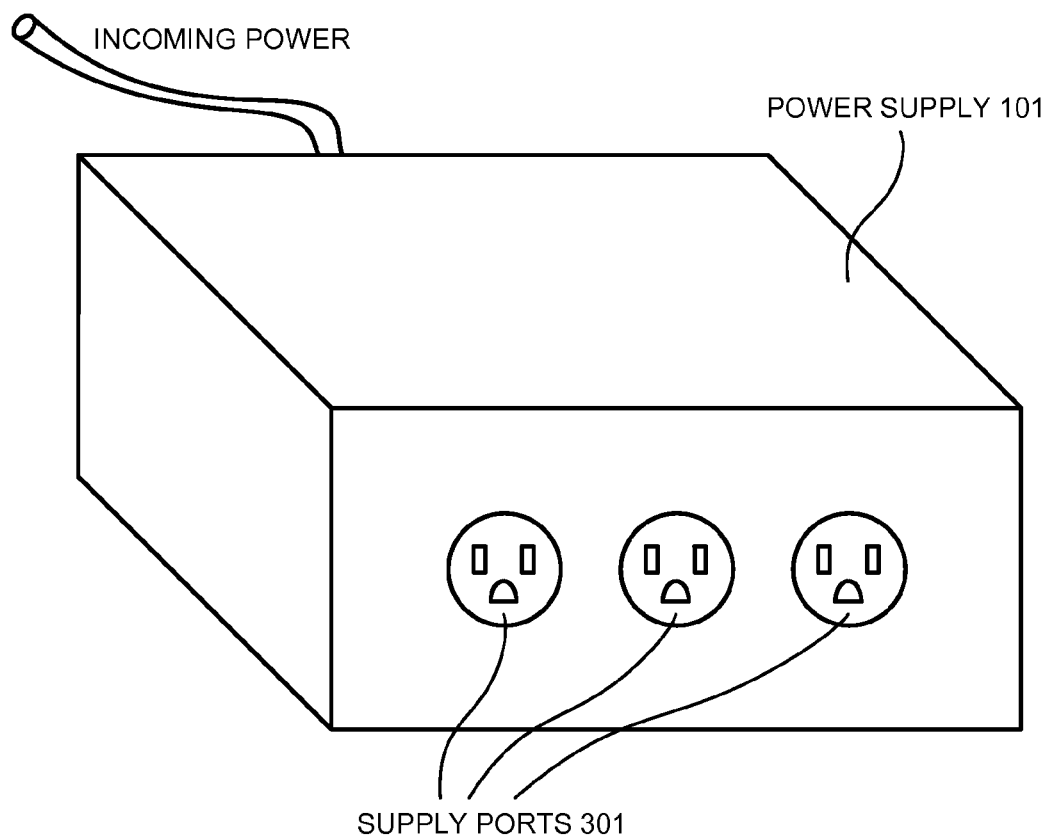
FIG. 3 is a perspective view of an example power supply in accordance with one or more aspects as described herein.

FIG. 3 is a perspective view of an example implementation of a power supply 101. The power supply 101 may have a case and/or frame, one or more power cords or other wires for receiving the incoming power, and/or one or more supply ports 301 for providing power to the power lines 106. Some or all of the elements of the power supply 101 (e.g., the computing device) may be partially or fully enclosed in the case and/or frame.

Each of the power supplies 101 of FIG. 1 may be coupled to one or more power lines 106, which the power supplies 101 may selectively and dynamically turn on (provide power through) and turn off (remove power from) as desired. For example if the power supply 101-A determines that power should be applies to the power line 106-A coupled to the powered device 102-A, then the power supply 101-A may apply power to the power line 106-A. Likewise, the power supply 101-A may selectively remove power from the power line 106-A. The same may be said for the power lines 106-B and 106-C. The ability to selectively apply and remove power to/from a particular one of the power lines 106 may be useful where, for example, it is desirable to reboot a selected one or more of the powered devices 102.

As will be described below in at least some of the examples, it may also be desirable to power on and/or power off one or more of the powered devices 102 in order to identify which of the powered devices 102 is coupled to which of the power lines 106. As discussed previously, the power supplies 101 and the powered devices 102 may be able to communicate with each other via the power lines 106 and/or via another method such as via wireless communication. Thus, each of the devices 101/102 that is able to communicate wirelessly may include a wireless communication device, such as a radio frequency antenna, infra-red transceiver, and/or the like. Wireless communication may use any communication standard, such as, but not limited to, the ZigBee RF4CE standard, the IEEE 802.11 standard, and/or the ZigBee/Z-Wave IEEE 802.15.5 standard. Where such inter-device communication is wireless, it may be desirable to pair each powered device 102 with its corresponding power supply 101 that is providing the powered device 102 with power. However, it may or may not be possible to recognize which powered device 102 is connected to which power line 106. For example, assume that the powered device 102-B is initially coupled to the power line 106-B. The power supply 101-A may sense that a load has been added to the power line 106-B, and the power supply 101-A may be able to wirelessly communicate with the powered device 102-B. But the power supply 101-A may not necessarily know that the powered device 102-B coupled to the power line 106-B is the same device as that with which it is communicating. For the power supply 101 to be able to power and disable the correct power line 106, it may be helpful for the power supply 101 to know which powered device 102 is coupled to which power line 106.

Figure 4:
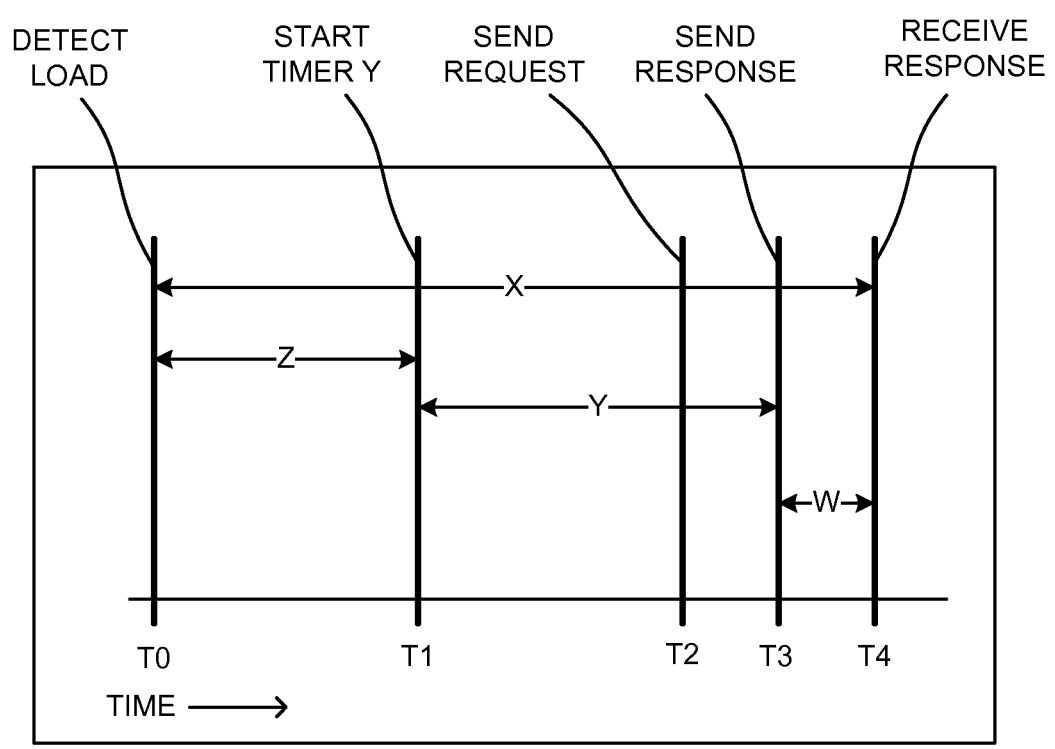
FIG. 4 is an example time diagram in accordance with one or more aspects as described herein.

Accordingly, the following example with reference to FIGS. 4, 5-A, and 5-B will show a possible way to identify a powered device 102 that is newly coupled to a power line so that the power supply 101 may wirelessly pair with the powered device 102 and correlate the powered device 102 with the appropriate power line and/or power supply device(s). In the following example, it will be assumed that it is desirable that no two powered devices should simultaneously power on, which may, for example, place too high of a load on the power supply. It may be further desired and/or assumed that a powered device receiving a request from the power supply should respond to the request within in a predetermined time frame. As discussed below, various time values may be used to determine which powered device, out of a plurality of potential powered devices 102, the power supply 101 should pair with.

As mentioned above, an example of how such determination and pairing may be accomplished is described with reference to FIGS. 4, 5-A, and 5-B. The various steps in the flow charts of FIGS. 5-A and 5-B may be performed by one or more devices and/or with human interaction, such as any of the elements of FIGS. 1-3. While certain steps may be described below as being performed by a specific element, it will be understood that this is merely an example, and that each step may be performed by alternative elements. Moreover, while the steps are shown in a particular order and divided into specific steps, it will be understood that the order may be modified, and that one or more of the steps may be combined and that one or more of the steps may be further sub-divided into further steps.

At step 501, the power supply 101 may be operational and may already be providing power (e.g., DC or AC power, or any other transfer of energy) via one or more power lines 106 to one or more powered devices 102. At step 502 (time T0 in FIG. 4), one or more other powered devices 102 are connected to the power line, and the power supply 101 detects a load on the power line at step 503. For example, the powered device 102-B may be newly coupled to the power line 106-B. When the power supply 101 detects the load on the power line 106-B (for example), the power supply 101 may start a timer, referred to herein as timer X (where X is a value representing the amount of time passing since timer X was started). As will be described below, timer X may continue until a response message is wirelessly received from one or more of the powered devices 102 (there may be a value of X for each response message from the various powered devices 102 that respond) or until a predetermined timeout period has been reached (as this may indicate that the power supply 101 is not likely to be powering a device that supports such a wireless communication protocol and thus would not pair with the power supply 101 using such a protocol).

At step 504 (time T1 of FIG. 4), a given one of the powered devices 102 becomes operational and starts its own timer Y (where Y is a value representing the amount of time passing since timer Y was started). Each of the powered devices 102 may start time Y as soon as possible after boot-up, typically approximately time Z after boot-up (the difference between times T0 and T1 in FIG. 4). After waiting a certain amount of time (represented as the difference between time T0 and time T2 as shown in FIG. 4), at step 505, the power supply 101-A (for example) may wirelessly send a request message (e.g., a discovery request message) that may be received by one or more of the powered devices 102-A, 102-B, and/or 012-C (using the example of FIG. 1). The request message may contain or otherwise indicate information about the power supply 101-A (e.g., a device identifier, properties of the power supply, the type of power supply, etc.), which the powered devices 102 may use to determine whether the request message should be responded to or discarded. It may be desired that the request not indicate the value of timer X.

At step 506 (time T3 of FIG. 4), each of the powered devices 102 that receive the request message may note the amount of time (e.g., in milliseconds), as indicated by timer Y of the respective powered device 102, since the powered device 102 became operational that the powered device 102 received the request message. Each powered device 102 may further determine whether the message is from a power supply that is able to power it (e.g., based on the information indicated by the request), whether the powered device 102 supports communication with the particular power supply 101, and/or whether the powered device is already paired with a power supply and/or has lost communication to its previously-paired power supply. Assuming that the powered device 102 determines that it should pair with the power supply 101, the powered device 102 may respond to the request message by wirelessly sending a response message (e.g., a discovery response message). Thus, for example, in response to the request message sent by the power supply 101-A, powered devices 102-A and/or 102-B may respond (102-A may respond because it recognizes that it is powered by the power supply 101-A, and 102-B may respond because it is not yet wirelessly paired to any power supply). In this example, powered device 102-C may not respond because it may determine that it is already wirelessly paired with power supply 101-B and can thus safely ignored any message from power supply 101-A. However, if powered device 102-C is not yet wirelessly paired with any power supply, then powered device 102-C may also respond wirelessly with a response message. Thus, it is possible that the power supply 101-A may receive a single response or multiple responses, depending upon the configuration and status of the various powered devices that are within wireless communication range.

The response message may contain or otherwise indicate the value Y and a value Z. The value Z may be the amount of time that the powered device 102 takes to reach a state where the powered device 102 is able to enable its timer Y. Although the value Z may not be explicitly measured during this process, the value Z may be predetermined and known by the powered device 102. For example, the value Z may be hard- or soft-coded in to the powered device 102, such as in the drivers, middleware, and/or applications of the powered device 102, where the value of Z may be derived, for instance, by way of testing/development of the product at the factory, staging facility, and/or at another time. As mentioned above, the value of Z for a given powered device 102 may be the expected delay between when power is applied to the powered device 102 and when the powered device 102 starts timer Y.

At step 507 (time T4 of FIG. 4), the power supply 101 may receive the response message from the powered device 102 via, e.g., the power line. In response, the power supply 101 may note (e.g., record) the current value of timer X and associate that value with the received response. This may be performed for each response received. Thus, the value of X, for a given response, may represent the amount of time that has passed from when the load was detected until that response message was received by the power supply 101. The power supply 101 may also parse each response message, or otherwise use each response message to determine, the values Z and Y for each response message. At step 508, the power supply 101 may determine a value W (see FIG. 4) for each response message based on the value Y and the time the power supply 101 received the response message from the powered device 102. At step 509, for each of the one or more responses received, the power supply 101 may compare the value X to the value of Z+Y+W as a basis for determining whether the device providing the response is eligible for pairing. In other words, referring to FIG. 4, if the power supply 101 sends out the request at time T2 and receives a response at time T4, then the power supply 101 can estimate time T3. Because the value of X may not have been included in the original request message (e.g., by forcing the responding devices to send their values of Y and Z without knowing X), it may be difficult for a responding device to maliciously send a false response in an attempt to gain unauthorized pairing with the power supply 101. Otherwise, a responding device could potentially calculate Y and Z to make it likely that the power supply 101 would consider the device eligible for pairing. If the difference between X and (Z+Y+W) is less than a predetermined threshold value of each other, then the power supply 101 may consider X to equal (Z+Y+W) within a desired tolerance. If the difference between X and (Z+Y+W) is greater than a predetermined threshold value of each other, then the power supply 101 may consider X to not equal (Z+Y+W) within the desired tolerance. Where the difference is exactly equal to the predetermined threshold, then either outcome may be determined depending upon the desired implementation of the power supply 101. The predetermined threshold may be an absolute amount of time (e.g., a certain number of microseconds or milliseconds), or it may be an amount that depends upon the value of X, Y, Z, and/or W. For instance, the predetermined threshold may be a percentage of X, Y, Z, and/or W, either alone or in any combination or subcombination.

If the power supply 101 considers X to equal (Z+Y+W) within a desired tolerance, then at step 510, the power supply 101 may flag the powered device that sent the response message as a device that the power supply 101 should pair with. The process may continue, as represented by step 511, for a period of time so allow for other response messages from others of the powered devices (if any). For the other responses, the process of steps 507-510 may also be performed, and each of the responding powered devices may or may not be flagged for pairing depending upon the difference between X and (Z+Y+W).

The process may continue as shown in the flow chart of FIG. 5-B. At step 512, if after the time period the power supply 101 flags only a single responding powered device 102 for pairing, then the power supply 101 may initiate the pairing process with that powered device 102 at step 513. The pairing may be performed using at least wireless communication between the power supply 101 and the powered device 102.

On the other hand, if after the time period the power supply 101 has flagged two or more responding powered devices 102 for pairing, then the power supply 101 may note (e.g., store) the an identifier (ID) of each of the flagged powered devices 102. The identifier may include, for example, a network address, serial number, name, IEEE ID, MAC address, and/or any other identifier that may be associated with, and that may or may not uniquely identify, the discovered powered device. To accomplish this, each of the response messages may, for example, include or otherwise indicate the device ID of the respective powered device. At step 514, after a certain backoff time, the power supply 101 may further cut the power the power line that detected the new load (in this example, power line 106-B), thus causing one or more of the powered device(s) to reboot. The power supply 101 may further reset timer X (e.g., to a zero value) in preparation for the next steps in the process. The backoff time may be different for (e.g., randomly determined by) each of the power supplies 101, to help avoid a situation in which multiple power supplies 101 are time-locked into a repeating simultaneous power-down/power-up sequence.

At step 515, the power supply 101 may wirelessly send another request message (while the power remains cut from power line 106-B). At step 516, one or more of the powered devices 102 may again respond by wirelessly sending a response message, such as in the manner described above. At step 517, the one or more response messages may be received by the power supply 101, and the power supply 101 may note (e.g., store the device IDs of) the powered devices that respond to the request message, and may flag these powered devices as not being candidates for pairing (since the powered device 102-B is powered down in this example, it is not able to respond). At step 518, the power supply 101 may re-apply power back to the power line (in this example, to power line 106-B). At step 519, the powered device 102 restarts (and timer Y may be reset and then restarted after delay Z).

At this point, the process may then go back to step 502 and the process may be performed again. This time, when performing step 507, the power supply 101 may ignore response messages from those of the powered devices 102 that were flagged at step 517 for non-pairing. Also, the power supply may adjust, upward or downward, the time that the power supply 101 waits at step 505 before sending the request message (e.g., may adjust time T2 to be sooner or later relative to time T0).

After performing the process of FIGS. 5-A and 5-B, the power supply 101 may be able to construct and/or update a mapping of which powered devices 102 are coupled to which power lines 106. For example, the mapping by power supply 101-A may represent information such as shown below in Table 1.

TABLE 1

| POWER LINE | POWERED DEVICE |
| --- | --- |
| 106-A | 102-A |
| 106-B | 102-B |

Figure 6:
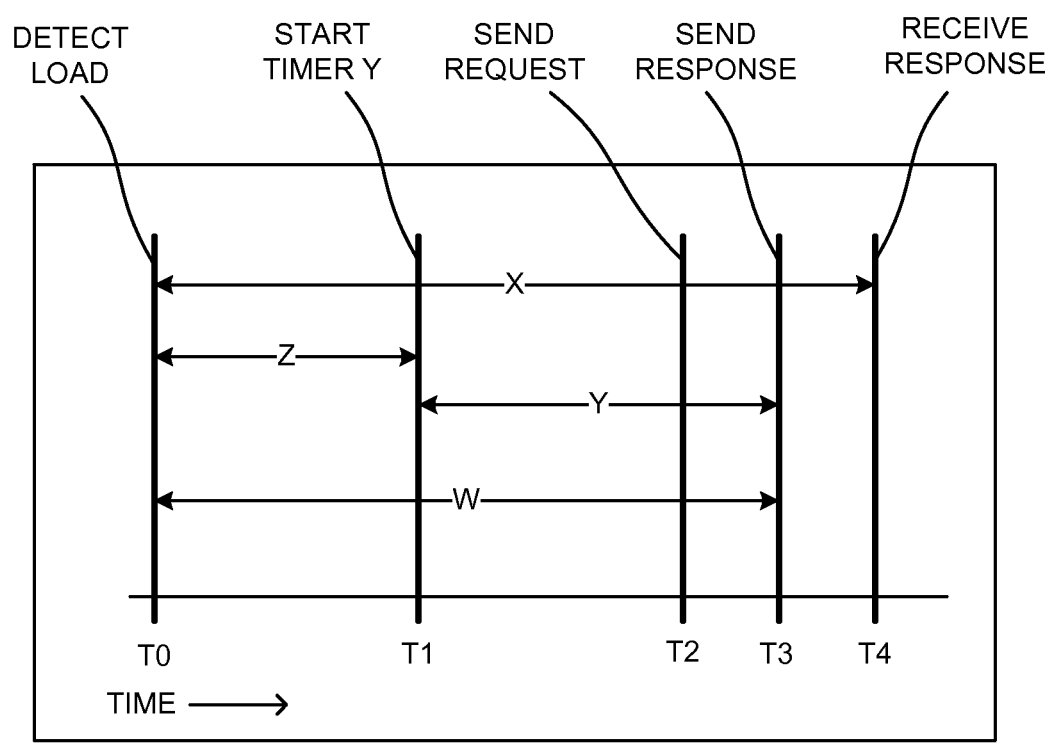
FIG. 6 is an example time diagram in accordance with one or more aspects as described herein.
Figure 7:
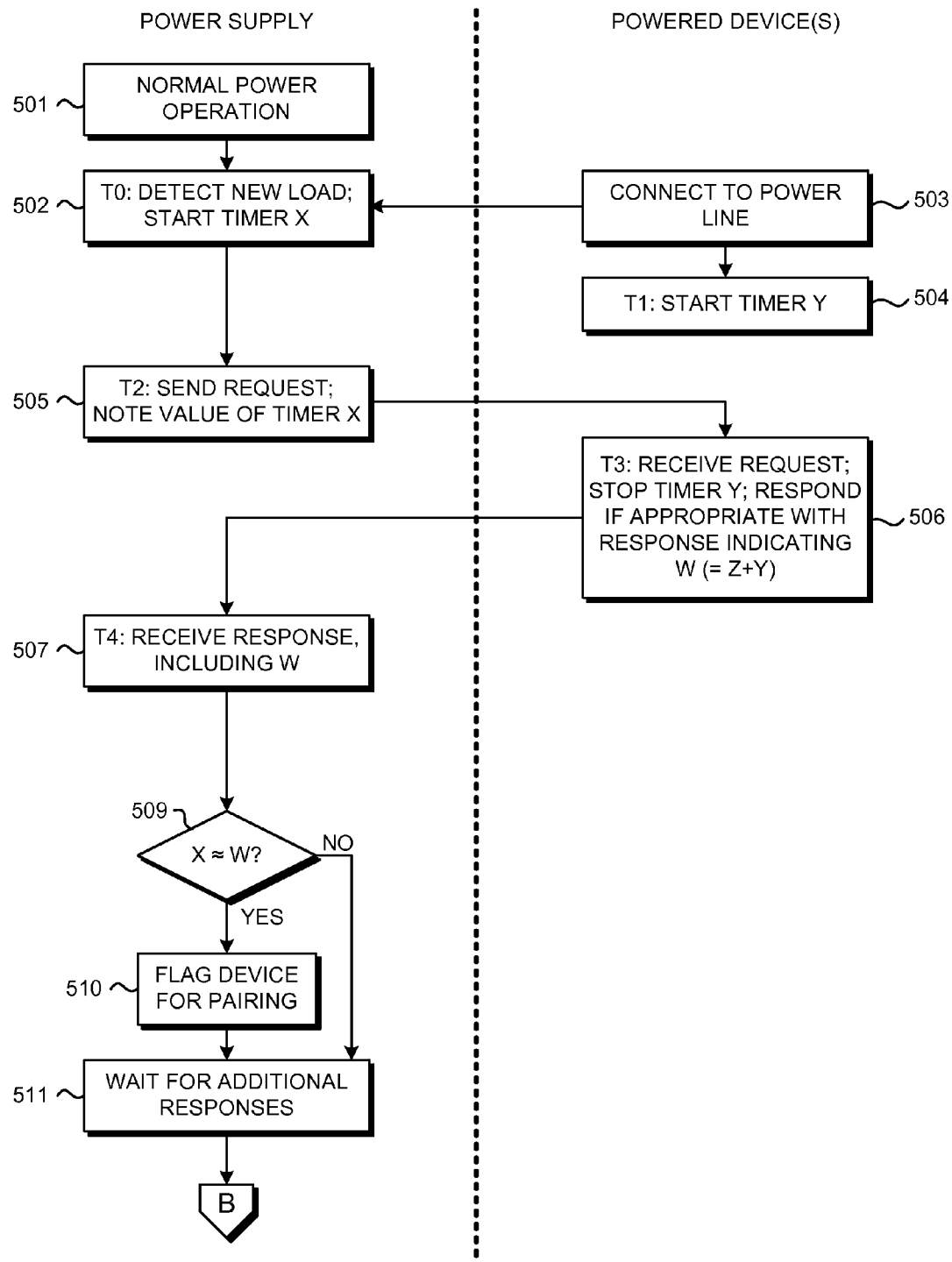
FIG. 7 shows an example flow chart in accordance with one or more aspects as described herein.

Another example of how a power supply 101 may determine which powered devices 102 are to be paired to may be accomplished is shown in the flow chart of FIGS. 6 and 7. The various steps in the flow chart of FIG. 7 may be performed by one or more devices and/or with human interaction, such as any of the elements of FIGS. 1 and 2. While certain steps may be described below as being performed by a specific element, it will be understood that this is merely an example, and that each step may be performed by alternative elements. Moreover, while the steps are shown in a particular order and divided into specific steps, it will be understood that the order may be modified, and that one or more of the steps may be combined and that one or more of the steps may be further sub-divided into further steps.

The process of FIG. 7 may generally be similar to the process as described above with regard to FIGS. 5-A and 5-B, and may include at least some or all of the following differences. For example, the power supply 101 may note the value of the timer X for each received response at step 505 (when the request message is sent) rather than at step 507 (when the response message is received by the power supply 101). Thus, in this example, X may represent the time period between time T0 and T2 of FIG. 6 (as opposed to the example of FIG. 5-A, in which X represents the time period between time T0 and time T4 of FIG. 4). Also, at step 506, rather than the response message indicating the values of Y and Z, the response message may indicate the value of W. In this case, each powered device 102 may calculate W based on Y and Z (for instance, W may equal Z+Y), and simply send W. In other examples, the response message may indicate W and also one or both of Y and Z.

In the present example, because the value of W may be indicated directly by the response message, the determination at step 509 may also be different from the determination as described above with regard to FIG. 5-A. In the example of FIG. 7, the determination of step 509 may include comparing the value of X with the value of W. If the difference between X and W is less than a predetermined threshold value of each other, then the power supply 101 may consider X to equal W within a desired tolerance. If the difference between X and W is greater than a predetermined threshold value of each other, then the power supply 101 may consider X to not equal W within the desired tolerance. Where the difference is exactly equal to the predetermined threshold, then either outcome may be determined depending upon the desired implementation of the power supply 101. The predetermined threshold may be an absolute amount of time (e.g., a certain number of microseconds or milliseconds), or it may be an amount that depends upon the value of X and/or W. For instance, the predetermined threshold may be a percentage of X and/or W. As the process of FIG. 7 moves to step 511, the process may continue, for example, with steps 512-519 as previously described with reference to FIG. 5-B.

Figure 8:
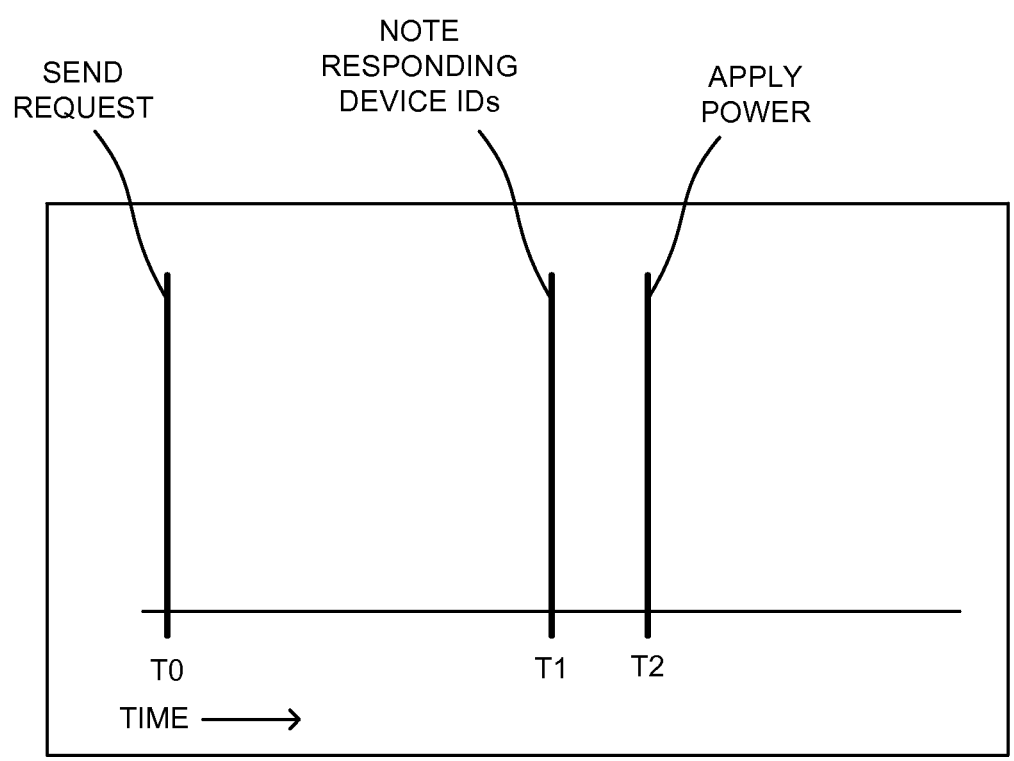
FIG. 8 is an example time diagram in accordance with one or more aspects as described herein.
Figure 9:
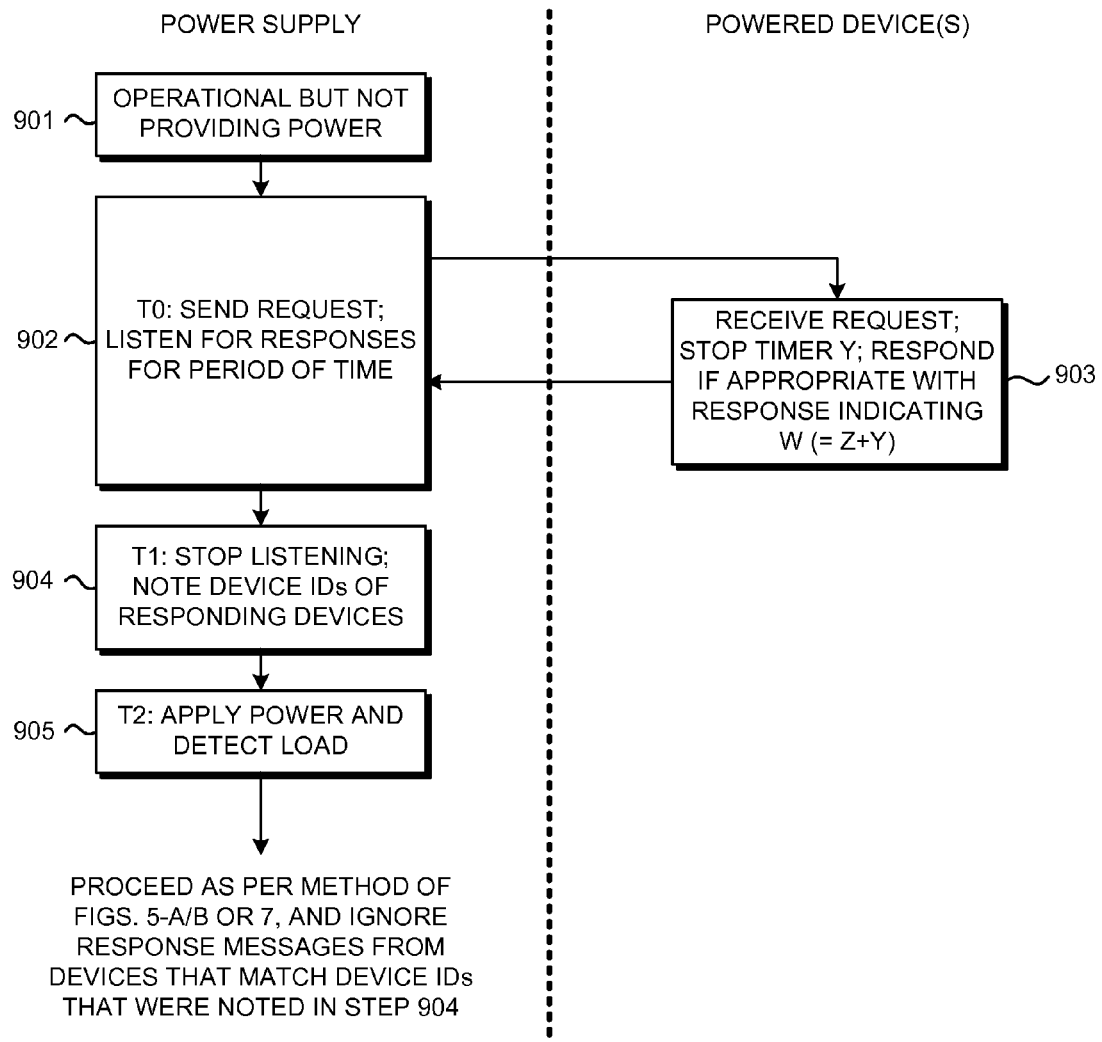
FIG. 9 shows an example flow chart in accordance with one or more aspects as described herein.

Yet another example of how a power supply 101 may determine which powered devices are to be paired to is described with references to FIGS. 8 and 9. The various steps in the flow chart of FIG. 9 may be performed by one or more devices and/or with human interaction, such as any of the elements of FIGS. 1 and 2. While certain steps may be described below as being performed by a specific element, it will be understood that this is merely an example, and that each step may be performed by alternative elements. Moreover, while the steps are shown in a particular order and divided into specific steps, it will be understood that the order may be modified, and that one or more of the steps may be combined and that one or more of the steps may be further sub-divided into further steps.

At step 901, the power supply 101 may be operational yet not providing power to any of the powered devices 102. At step 902 (time T0 of FIG. 8), the power supply 101 may wirelessly send a request message. The power supply 101 may listen for a period of time to collect any wireless response messages that may be received over, e.g., the power line. At step 903, those of the powered devices 102 that are currently powered may wirelessly receive the request message, and may wirelessly respond with a response message. At step 904 (time T1 as shown in FIG. 8), the power supply 101 may stop listening for response messages and may note (e.g., store) the device IDs of any powered devices that sent a response message. This is because any responses are assumed to have been received from powered devices 102 that were currently receiving power; it may be assumed that any powered devices 102 not receiving power are unable to send a response message. As described above, the response messages may include or otherwise indicate the device IDs of the responding powered devices 102.

At step 905 (time T2 as shown in FIG. 8), the power supply 101 may apply power to one or more of its power lines 106 and detect one or more loads on the power line(s) 106. When the power supply 101 detects the load(s) on the power line(s), the power supply may proceed, for example, as described above with regard to either FIGS. 5-A/B or FIG. 7. Moreover, in this case, the power supply 101 may ignore any response messages from powered devices 102 that match device IDs that were noted in step 904.

The power supplies 101 and the powered devices 102 may also communicate with each other over the power lines 106, if desired. This may provide another way for a given power supply 101 to correlate a given powered device 102 with a given power line 106. An example process for communicating over a power line 106 will be described with reference to FIGS. 10 and 11. The various steps in the flow chart of FIG. 11 may be performed by one or more devices and/or with human interaction, such as any of the elements of FIGS. 1-3. While certain steps may be described below as being performed by a specific element, it will be understood that this is merely an example, and that each step may be performed by alternative elements. Moreover, while the steps are shown in a particular order and divided into specific steps, it will be understood that the order may be modified, and that one or more of the steps may be combined and that one or more of the steps may be further sub-divided into further steps.

At step 1101, the power supply 101 may detect an event associated with the power line. For example, the power supply 101 may detect a change in the load on the power line (e.g., a powered device 102 may be coupled to a power line 106, thereby changing the load at that power line 106). At step 1102, the power supply 101 may wait a certain amount of time after the event is detected, and then may determine a whole number N. Alternatively, step 1102 may be performed regardless of any detected event. The value of N may be determined in any manner desired, such as randomly, pseudo-randomly, using a deterministic algorithm, using a counter, and/or in any other manner. The determination of N may or may not involve limiting the value of N to be within upper and/or lower limits. For example, the power supply may determine N to be a whole number that is greater than (or greater than or equal to) a lower limit value (e.g., greater than zero, or greater than one, or greater than three, greater than or equal to three, etc.) and/or that is smaller than (or smaller than or equal to) an upper limit value (e.g., smaller than one hundred, smaller than or equal to ten, smaller than twenty-five, etc.). For discussion purposes of the present example, it will be assumed that N=5. Again, N may be any value, and the particular value of 5 is chosen arbitrarily herein for simplicity of explanation only.

Figure 10:
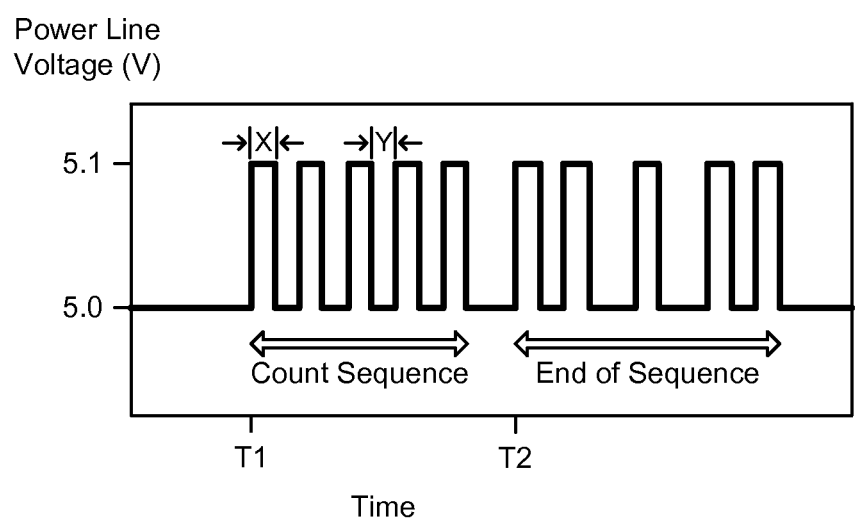
FIG. 10 is an example voltage diagram in accordance with one or more aspects as described herein.
Figure 11:
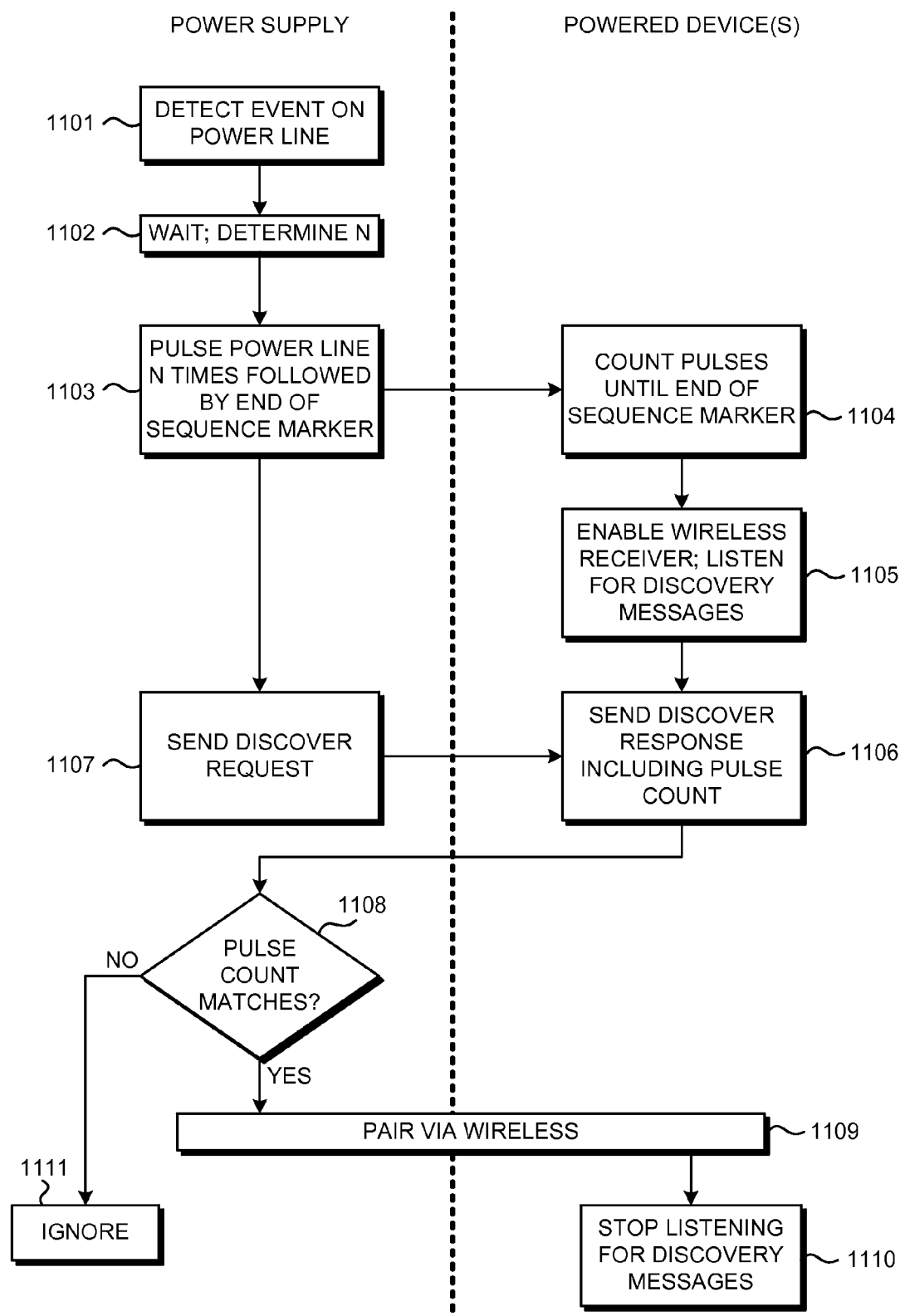
FIG. 11 shows an example flow chart in accordance with one or more aspects as described herein.

At step 1103, the power supply 101 may pulse or otherwise modulate the power line N times, and this may be followed by an end-of-sequence marker. The end-of-sequence marker may be, for instance, a predetermined pattern of pulses or other predetermined modulation pattern that may be recognized by a powered device 102 as such. For example, FIG. 10 shows a count sequence beginning at time T1 involving N=5 pulses of the power line, followed by an end-of-sequence marker beginning at time T2, that in this example is a pair of pulses followed by a delay, followed by a single pulse, followed again by a delay, and then followed by another pair of pulses. The particular end-of-sequence marker of FIG. 10 is arbitrary and again is chosen only for explanation purposes. The end-of-sequence marker may be, for example, any other pattern of pulses. It may be desirable that the end-of-sequence maker be distinguishable from the count sequence, such as by including a delay between the count sequence and the end-of-sequence marker.

In the example of FIG. 10, the pulses in the count sequence and/or in the end-of-sequence maker may be of the same length in time X and/or may be separated by a same length in time Y. However, this is not necessarily the case, and the pulse length, time between pulses, and/or any other modulation property may be implemented in any manner desired. Moreover, while the pulses are shown in FIG. 10 as voltage modulation pulses, the pulses may alternatively or additionally be implemented as current modulation and/or frequency modulation of the power present on the power line. And, while the pulses are shown for simplicity in FIG. 10 as square pulses, the pulses may be of any shape and may be in any direction (e.g., a pulse that reduces voltage rather than increases voltage). Moreover, the particular voltages shown in FIG. 10 are arbitrary, and may be of any values.

Referring again to FIG. 11, at step 1104, one or more powered devices 102 may receive the pulsed signal over the power line, and may count the number N of pulses received until the end-of-sequence marker is detected. As discussed above, the powered devices 102 may be pre-configured to recognize the predetermined end-of-sequence marker pattern. At step 1105, in response to determining the pulse count N, the one or more powered device 102 may enable their respective wireless (e.g., radio frequency) receivers/transceivers, and may listen for any wireless request messages to initiate the pairing process. At step 1106, a response message may be wirelessly sent by one or more of the powered device 102. Because the response message may indicate the pulse count that was provided at step 1103 and counted at step 1104, and because the response message may further indicate the device ID of the responding powered device 102, the power supply 101 receiving the response message(s) may be able to determine that a given one of the response messages came from the powered device 102 that was newly added to the power line 106 (and that had correctly counted the pulses on the power line 106), and the power supply 101 may also now know the device ID of that powered device 102. Any other wireless responses may be ignored by the power supply 101 at this time (step 1111).

Thus, at step 1108, if the pulse count of a received response message equals the pulse count as was sent in step 1103 (e.g., in the above example, five pulses), then at step 1109 the power supply 101 may proceed with wirelessly pairing with the powered device 102, using the device ID identified in the corresponding response message. Once pairing is complete, the powered device 102 with which the pairing was performed may stop listening for discovery messages 1110. If the powered device 102 receives a further set of pulses on the power line 106 to which it is coupled, then the powered device 102 may again listen for discovery request messages and the process may again be performed beginning at, for instance, step 1103.

While a stream of power line pulses has been described as being used to uniquely identify a request message, other patterns of modulating the power line may additionally or alternatively be used. For example, the time pattern of the pulses may be used for identification in addition to or instead of the number of pulses. Moreover, the pulses may also be arranged to encode other information (e.g., binary data), such as, but not limited to, a device ID of the power supply 101 and/or of the powered device 102 sending the message, a status, a message type identifier, etc. In further examples, a key, random data, and/or some other data may be included in the request. A responding powered device 102 may combine (e.g., hash) the random data and/or key with the pulse count and provide the result in the response message. More generally, the request message may contain certain information that may be included in, and/or otherwise used to generate information in, the response message. The information in the response message may, in any event, be of such a nature that the power supply 101 may correlate and verify the information in the response message with information in the request message.

As discussed above, the power supplies 101 may also be configured to monitor for anomalies in the incoming power and/or in the power being provided over the power lines 106. Examples of such anomalies may include a low voltage condition (e.g., a "brown out"), a high voltage condition, a voltage spike (e.g., due to a lightning strike), an inverse voltage spike (brief lowering of voltage), a change in frequency and/or other power quality characteristic, and/or a non-uniformity in the voltage (e.g., not constant within a given tolerance). Any of these anomalies may themselves pose problems to the powered devices 102 and/or may be indicators of more significant anomalies to follow. For example, a pattern of recent short brownout periods may mean that there is a higher risk than usual of a power outage in the near future. A thunderstorm or other severe weather in the vicinity may also raise the risk for a power anomaly.

Some power anomalies may be so severe that the powered devices 102 may no longer be able to function. In such a case, the powered devices 102 may immediately lose functionality or may be operable for only a brief or longer period(s). For example, if the incoming power is suddenly cut off, then the power supplies 101 may not be able to provide any power at all to the powered devices 102. Where the power supplies 101 have a battery backup circuit, the power supplies 101 may only be able to provide power to the powered device 102 for a limited time. Where the powered devices 102 have their own battery backup circuit, a removal of power at the power lines 106 may likewise result in a limited operable time period.

Depending upon the nature of the powered device 102, it may pose a problem if the powered device 102 were suddenly no longer able to operate at certain times, such as during a power outage. Also, sudden or uncontrolled shut-downs or power interruptions to a powered device 102 may cause the powered device 102 to lose valuable data and/or settings. It may therefore be desirable to provide a way to potentially allow the powered devices 102 to take action (such as protective, remedial, and/or proactive action) prior to, concurrently and/or in the future, and/or in response to, a power anomaly or pattern of power anomalies. For instance, the powered devices 102 may save certain essential data, e.g., to nonvolatile storage prior to completely losing power, may disconnect from the power line 106 (e.g., stop receiving the power), and/or may implement a controlled shut-down procedure.

Another impact that power anomalies may have is on the lifespan of the powered devices 102. In general, electronic devices may have an expected lifespan given ideal circumstances. However, the actual lifespan may depend upon the actual circumstances experienced by a device, such as power spikes and other over-voltage conditions. While some types of power anomalies may reduce lifespan on average, other types of power anomalies may not. It may therefore also be desirable to track the expected lifespan of a powered device 102, and to track the expected lifespan not only with the passage of time, but also to modify the expected lifespan in response to the powered device 102 experiencing certain types of power anomalies.

An example process for warning powered devices 102 of power anomalies and/or for tracking expected lifespan will be described with reference to FIGS. 12-A and 12-B. The various steps in the flow charts of FIGS. 12-A and 12-B may be performed by one or more devices and/or with human interaction, such as any of the elements of FIGS. 1-3. While certain steps may be described below as being performed by a specific element, it will be understood that this is merely an example, and that each step may be performed by alternative elements. Moreover, while the steps are shown in a particular order and divided into specific steps, it will be understood that the order may be modified, and that one or more of the steps may be combined and that one or more of the steps may be further sub-divided into further steps.

At step 1201, a given power supply 101 may monitor the incoming power and/or the power on the power lines 106. Monitoring may be performed on a continuous or an intermittent (e.g., periodic) basis. During the monitoring, the power supply 101 may look for anomalies in the incoming power and/or in the power supplied on the power lines 106. Moreover, the power supply 101 may, in addition to or as an alternative to monitoring anomalies, store and/or analyze data tracking historical power anomalies that are detected. The power supply 101 may further track the expected life span of any powered devices 102 that are paired with the power supply 101. To accomplish this, the powered device 102 and/or the service provider 105 may provide information about the expected lifespan of the powered device 102. Alternatively, the power supply 101 may already have pre-stored information about the lifespans of the various powered devices 102. Where the powered devices 102 provide the lifespan information, this may be provided to the power supply 101 during, e.g., the wireless pairing process. For example, a given powered device 102 may indicate to the power supply 101 that the powered device 102 has an initial expected lifespan of five years (this time period is only a non-limiting example). In still further examples, the lifespan information may remain with, e.g., the service provider 105, which may also perform the lifespan tracking such as described herein.

The power supply 101 may store data, for each of the powered devices 102 with which it is paired, indicating the current value of the expected lifespan of that powered device 102. Over time, the power supply 101 may decrement the expected lifespan. For example, if the expected lifespan is initially five years, then after one year it may be expected that the power supply 101 will have decremented expected lifespan to four years. The above example is an example in which the expected lifespan is the remaining expected lifespan, counting down until it is expected that the lifespan is over. In other examples, the lifespan may be indicated (and stored) as a date and/or a time that the expected lifespan is to end. Thus, in these examples, rather than decrementing the remaining expected lifespan, the date and/or time may be moved up (earlier in time).

At step 1202, the power supply 101 may determine whether it is appropriate to continue supplying, or restart supply of, power to one or more of the powered devices 102. As will be described below, the power supply 101 (and/or an associated decision making element such as a computing device 200 that may be part of and/or in communication with the power supply 101) may have previously chosen to stop supplying power to one or more of the powered devices 102, e.g., in the event of an anomaly such as a detected major power spike, and so at this step the power supply 101 may determine whether it is appropriate to re-supply or continue supplying power to the one or more powered devices 102. If so, then power is supplied at step 1203, and then the process may move to step 1204. Otherwise, step 1203 may be skipped.

At step 1204, the power supply 101 (and/or the above-mentioned associated decision-making element) may determine whether the expected life span is below a predetermined threshold value. For example, if the expected life span is measured as remaining expected life span, then the predetermined threshold value may be a minimum amount of remaining expected life span. The predetermined threshold may be a non-zero value (e.g., thirty days, or five days, or two months, etc.). Or, if the expected life span is measured as an end date and/or time, then the determination at step 1204 may involve comparing the current date and/or time with a predetermined threshold date and/or time. In this case, the predetermined threshold date and/or time may be before the expected life span end date and/or time (e.g., thirty days prior, or five days prior, or two months prior, etc.). If so, then this may indicate that it may be time to replace and/or perform maintenance on the powered device 102. In this case, the power supply 105 may issue a warning message to, e.g., the powered device 102, the user, and/or the service provider 105. If the warning message is sent to the powered device 102, then the powered device 102 may itself notify the service provider 105, such as via the network 104, and/or the user. In response, the service provider 105 may determine whether to send a replacement powered device to the user and/or to initiate maintenance on the powered device 102. Otherwise, step 1205 may be skipped.

In either case, the process may then proceed to step 1206, in which the power supply 101 (and/or the above-mentioned associated decision-making element) may determine whether there is a power anomaly. If not, then the process may return to another step such as step 1201. In one aspect, the process may start at step 1206. In such an aspect, for example, all instances where the process is described as returning to step 1201 may instead return to step 1206. In either case, the process may proceed to steps 1207 and 1209. At step 1207, the power supply 101 may determine whether the power anomaly affects expected life span of one or more of the powered devices 102. If not, then the process may return to step 1201 (as shown in FIGS. 12-A and 12-B, the process may also, in parallel and/or at another time, proceed to step 1209). If it is determined that the expected life span is affected, then the process may proceed to step 1208, during which the power supply 101 may decrement the remaining expected life span and/or move up the end date of the expected life span (depending upon which form of the expected life span is being tracked). The process may return to step 1201.

To determine whether and/or how much the power anomaly affects the life span of a given powered device 102, the power supply 101 may have access to (e.g., store) data associating various power anomalies with various life span factors. For example, the data may represent information for a given powered device 102 such as shown in Table 2 below.

TABLE 2

| POWER ANOMALY | LIFE SPAN FACTOR | NOTIFY? |
|---|---|---|
| single voltage spike, class 1 | reduce lifespan by X amount | no |
| single voltage spike, class 2 | reduce life span by Y amount | no |
| long-term over-voltage, type 1 | reduce life span by Z amount multiplied by the time length of the over-voltage in seconds | no |
| multiple power spike pattern | reduce lifespan by X amount multiplied by the number of spikes | yes |
| brown-out | none | yes |

At step 1209, the power supply 101 may determine whether one or more notifications should be sent. Step 1209 may be performed regardless of whether it is determined at step 1207 that the power anomaly affects expected life span. For example, one or more notifications may be sent to the powered devices 102, to other devices (such as device 103), and/or to the service provider 105, in which the one or more notifications may indicate the existence and/or nature of the power anomaly. Notification messages may be sent via any communication path(s) between the power supply 101 and the powered devices 102 and/or any other devices and/or systems. For example, the notification messages may be sent wirelessly and/or via a wired path such as via a power line 106 and/or via another non-power-transmitting communication link. Thus, for example, the power supply 101 may detect the power anomaly that affects power over a power line 106 to a powered device 102, and in response the power supply 101 may sent a notification message over, for instance, a parallel wireless communication path. The wireless notification message may be received by the powered device 102 that is being powered by the power supply 101, by other powered devices 102, by other power supplies 101, by the other device 103, and/or by any other entities such as by the service provider 105 (e.g., via the network 104).

Whether notification should occur, and to where notifications should be directed, may depend upon the type of power anomaly, the timing of the power anomaly, and/or other characteristics of the power anomaly. For example, the information in Table 2 indicates that the powered device 102 should be notified when a multiple voltage spike pattern (e.g., at least a threshold number of voltage spikes occurring within no more than a threshold time period) is detected and when a brown-out is detected. If so, then at step 1210, the power supply 101 may notify the powered device 102 such as via wireless communication and/or via communication over the power line 106 that is coupled to the powered device 102. Otherwise, the process may return to step 1201.

In response to receiving such a notification, the powered device 102 (and/or any other devices and/or systems that receive the notification) may take action (e.g., proactive and/or remedial action), such as by storing certain data in non-volatile memory, initiating a controlled shut-down procedure, notifying the user (e.g., with a warning to save data), notify the service provider 105, and/or the like.

Notifications may be additionally or alternatively sent to one or more other destinations, such as device 103 and/or to the service provider 105. The notification may be directed to one or more specific destinations, or it may be transmitted, e.g., broadcast, such that any device may receive and act upon the notification as desired.

For instance, the notification message may be wirelessly broadcast by the power supply 101 such that any device and/or system in the vicinity of the wireless signal may receive the notification message. In some examples, the service provider 105 may be notified of any anomaly that affects lifespan of a device. The notification may include, for example, an indication of the nature of the anomaly, the effect on expected lifespan, the current expected lifespan, and/or other information. In still further examples, a device may track its own lifespan and/or the lifespan of any other device(s) based at least in part on detected power anomalies. For example, a power supply 101 may track its own lifespan and the lifespan of one or more powered devices 102 and/or other devices 103. Or, a powered device 102 may track its own lifespan and/or the lifespan of one or more other powered devices 102, one or more other devices 103, and/or one or more other power supplies 101.

At step 1211, the power supply 101 may determine whether to shut down and/or otherwise disrupt power to the powered device 102 such as by cutting off the power line 106 to the powered device 102. This may be advisable, for instance, where one or more large voltage spikes are detected. If so, then at step 1212, the power supply 101 may or may not wait at least a predetermined period of time (to allow the powered device 102 to take protective action), and then the power supply 101 may cut off the power to the power line 106 at step 1213. The process may then return to step 1201.

Figure 13:
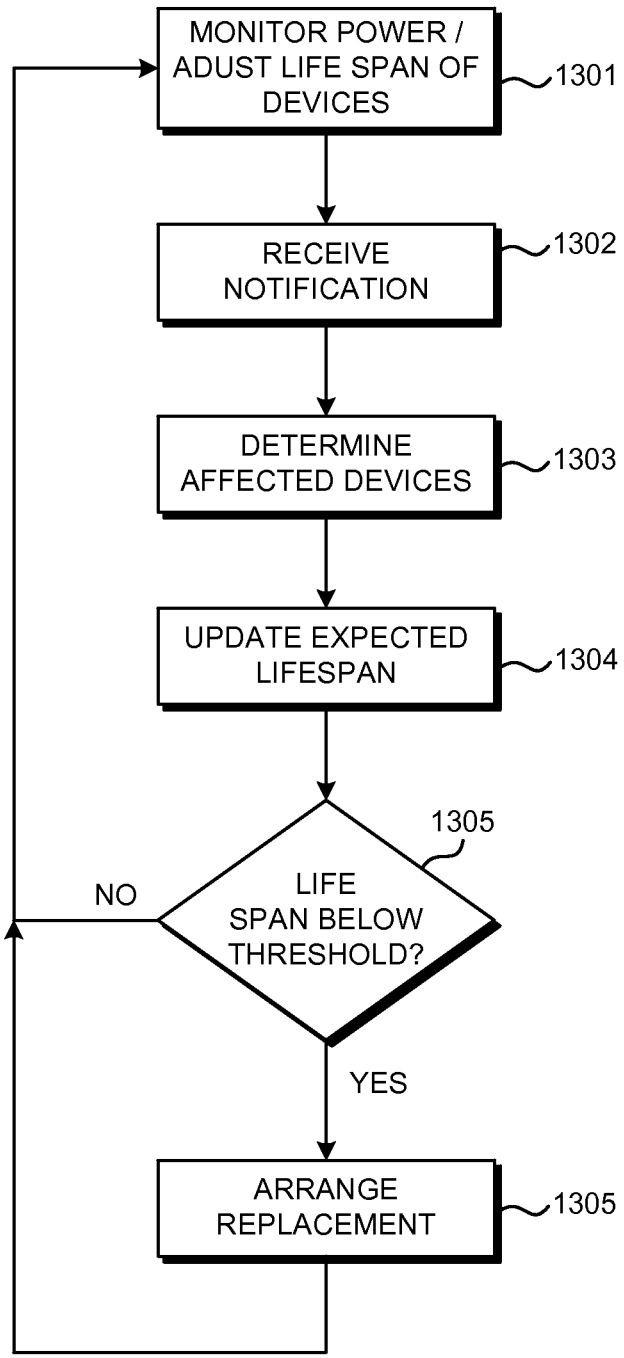
FIG. 13 shows another example flow chart in accordance with one or more aspects as described herein.

As mentioned above, the lifespans of various devices may additionally or alternatively be tracked by another entity, such as by the service provider 105. An example of how this may work is described with reference to the flow chart of FIG. 13. While the various steps in the flow chart of FIG. 13 are described as being performed by one or more computing devices of the service provider 105, any of the steps may be performed by any one or more devices and/or humans, such as any of the elements of FIGS. 1-3. Moreover, while the steps are shown in a particular order and divided into specific steps, it will be understood that the order may be modified, and that one or more of the steps may be combined and that one or more of the steps may be further sub-divided into further steps.

At step 1301, one or more computing devices at the service provider 105 (for example) may continuously or intermittently monitor and adjust the expected life span of one or more devices. For example, the service provider 105 may monitor the expected life spans of any of devices 101-A, 101-B, 102-A, 102-B, 102-C, and/or 103. To accomplish this, the service provider 105 may have, for instance, the above-mentioned lifespan information for each of the devices to be monitored. For example, one type of device may have an initial expected lifespan of five years, while another type of device may have an initial expected lifespan of three years.

In addition, the service provider 105 (for example) may, on occasion, receive a notification of a power anomaly. The notification may be sent from any of the devices 101-103. For example, the notification may be a notification that was sent during step 1210 of FIG. 12-B. The notification may be received via, for instance, the network 104. In response to receiving the notification, the service provider 105 (for example) may determine which of the devices are affected by the power anomaly. To accomplish this, the service provider 105 may have information associating subsets of the devices with each other, which may be organized, for example, by user, by customer, by premises, etc. As an example, the service provider 105 may have information that the premises 106-A has six devices being tracked—power supplies 101-A and 101-B, powered devices 102-A, 102-B, and 102-C, and other device 103. The service provider 105 may have a database containing the expected lifespan data for some or all of the six devices and how various power anomalies are expected to impact the lifespans of the devices. Within the particular premises 106-A, one or more of the devices may be capable of monitoring and reporting the power anomalies. For example, if only power supply 101-A has this capability, then it may report power anomalies to the service provider 105 on behalf of all of the devices at the premises 106-A. Or, if both of the power supplies 101-A and 101-B have this capability, one or more both may report a power anomaly. If one of the power supplies 101, for example, detects an anomaly (e.g., power supply 101-A), then power supply 101-A may either directly report the appropriate data to the service provider 105, or the data may be reported by way of one of the powered devices 102-B and/or the other device 103.

At step 1304, the service provider may analyze the anomaly data and update the life span of each known device in the premises 106-A to be affected. This may continue until, at some point, the service provider 105 (or another entity) determines that one or more of the devices has reached a critical life span state. Thus, at step 1305, the service provider 105 and/or another entity may determine whether, for instance, the life span of one or more of the devices at the premises 106-A has dropped below a predetermine threshold. This determination may be performed such as in the manner described previously with reference to step 1204 of FIG. 12-A. At step 1305, the service provider 105 and/or another entity may take the appropriate action, such as by arranging those device(s) having a lifespan below the threshold to be replaced. For example, the service provider 105 may arrange for a human customer service representative of the service provider 105 to call a telephone number associated with the premises 106-A to schedule a technician visit to replace the applicable device(s). Or, an email and/or other automated message may be sent to the user of the premises 106-A. Or, a replacement device may simply be shipped to the user, with or without prior notification to the user.

The various features described above are merely non-limiting examples, and can be rearranged, combined, subdivided, omitted, and/or altered in any desired manner. For example, features of the servers can be subdivided among multiple processors and computing devices. The true scope of this patent should only be defined by the claims that follow.

What is claimed is:

1. A method, comprising:
    providing power from a first device to a second device over a first path;
    detecting, by the first device, a power anomaly;
    responsive to detecting the power anomaly, determining whether to notify the second device;
    responsive to determining to notify the second device, sending a message from the first device to the second device;
    tracking, by the first device, an expected life span of the second device; and
    adjusting, by the first device, the expected life span of the second device in response to the detecting the power anomaly.

2. The method of claim 1, wherein the sending comprises sending the message from the first device to the second device via a communication link different from the first path.

3. The method of claim 2, wherein the first path is a wired path and the communication link is a wireless communication link.

4. The method of claim 1, further comprising:
    waiting, by the first device, a predetermined delay after sending the message; and
    stopping, responsive to the predetermined delay occurring, the power from being provided to the second device.

5. The method of claim 1, further comprising:
    comparing the expected life span with a threshold value;
    based on an outcome of the comparing, determining whether to replace the second device; and
    generating a message based on an outcome of the determining whether to replace the second device.

6. The method of claim 1, wherein the first device comprises a power supply that comprises a computing device that performs the determining.

7. A method, comprising:
    responsive to detecting a second device being electrically coupled to a first device via a first path, the first device starting a timer and sending a request message via a communication link separate from the first path;

responsive to receiving a response message, the first device comparing a value of the timer with information indicated by the response message;

depending upon an outcome of the comparing, the first device associating a device identifier indicated by the response message with the second device;

providing power from the first device to the second device via the first path; and sending to the second device via the communication link, responsive to a detected power anomaly, another message indicating the device identifier.

8. The method of claim 7, wherein the first path is a wired path and the communication link is a wireless communication link.

9. The method of claim 7, further comprising:

waiting, by the first device, a predetermined delay after sending the another message; and stopping, responsive to the predetermined delay occurring, the power from being provided to the second device.

10. A method, comprising:

responsive to detecting a second device being electrically coupled to a first device via a first path, the first device sending N pulses via the first path to the second device;

the first device receiving, over a communication link separate from the first path, a response message indicating at least a pulse count and a device identifier;

the first device associating the device identifier with the second device responsive to a determination that N is equal to the pulse count; and sending to the second device via the communication link, responsive to a detected anomaly in power provided to the second device, another message indicating the device identifier.

11. The method of claim 10, wherein the first path is a wired path and the communication link is a wireless communication link.

12. The method of claim 10, further comprising:

waiting, by the first device, a predetermined delay after sending the another message; and stopping, responsive to the predetermined delay occurring, the power from being provided to the second device.

13. A method, comprising:

sending, by a first device, a first message while providing power to at least one device of a group of second devices;

starting, by the first device, a timer;

sending, by the first device, a second message while not providing power to the at least one device of the group of second devices; and determining, by the first device, based on one or more responses from one or more devices of the group of second devices to one or both of the first and second messages, an identifier for the at least one device of the group of second devices, wherein the determining comprises determining the identifier further based on a value that the timer has when a response to the first message is received.

14. The method of claim 13, further comprising receiving a third message in response to the first message during the providing the power, wherein the third message indicates the identifier.

15. The method of claim 14, wherein no message indicating the identifier is received in response to the second message while the power is not being sent to the at least one device of the group of second devices.

16. The method of claim 13, further comprising:

detecting, by the first device, a power anomaly;

responsive to detecting the power anomaly, determining, by the first device, whether to send a third message; and responsive to determining to send the third message, the first device sending the third message.

17. The method of claim 16, further comprising:

waiting, by the first device, a predetermined delay after sending the third message; and stopping, responsive to the predetermined delay occurring, the power from being provided to the at least one device of the group of second devices.

18. The method of claim 13, wherein the first device comprises a power supply that comprises a computing device that performs the determining.

19. The method of claim 13, wherein the sending the first message comprises wirelessly sending the first message, and the sending the second message comprises wirelessly sending the second message.

20. The method of claim 13, wherein the starting the timer is performed when the first message is wirelessly sent.

* * * * *